(12) United States Patent
Giuca (10) Patent No.: US 10,311,043 B2
(45) Date of Patent: Jun. 4, 2019

(54) LOG QUERY USER INTERFACE

(71) Applicant: New Relic, Inc., San Francisco, CA (US)

(72) Inventor: Julian V. Giuca, San Francisco, CA (US)

(73) Assignee: New Relic, Inc., San Francisco, CA (US)

( * ) Notice: Subject to any disclaimer, the term of this patent is extended or adjusted under 35 U.S.C. 154(b) by 278 days.

(21) Appl. No.: 15/228,908

(22) Filed: Aug. 4, 2016

(65) Prior Publication Data

US 2018/0039666 A1   Feb. 8, 2018

(51) Int. Cl.
| | | |
|---|---|---|
| *G06F 16/30* | (2019.01) | |
| *G06F 16/23* | (2019.01) | |
| *G06F 16/33* | (2019.01) | |
| *G06F 16/245* | (2019.01) | |
| *G06F 16/332* | (2019.01) | |

(52) U.S. Cl.
CPC ........ *G06F 16/2365* (2019.01); *G06F 16/245* (2019.01); *G06F 16/33* (2019.01); *G06F 16/332* (2019.01)

(58) Field of Classification Search
USPC ........................................................ 707/694
See application file for complete search history.

(56) References Cited

U.S. PATENT DOCUMENTS

| | | | |
|---|---|---|---|
| 6,836,894 B1 * | 12/2004 | Hellerstein | ........... G06F 11/323 345/619 |
| 7,895,611 B2 | 2/2011 | Grabarnik et al. | |
| 9,208,206 B2 | 12/2015 | Blank, Jr. et al. | |
| 2012/0005542 A1 * | 1/2012 | Petersen | ............. G06F 11/0709 714/48 |
| 2014/0282031 A1 | 9/2014 | Hinterbichler et al. | |

FOREIGN PATENT DOCUMENTS

WO   WO 2009/046101 A1   4/2009

OTHER PUBLICATIONS

PCT International Search Report and Written Opinion, PCT Application No. PCT/IB2017/054621, dated Dec. 1, 2017, 10 pages.

* cited by examiner

*Primary Examiner* — Hung T Vy
(74) *Attorney, Agent, or Firm* — Fenwick & West LLP (57) ABSTRACT

A series of graphical user interfaces allows a user to define rules for parsing unstructured and structured log data and generate an aggregate rule to identify events across multiple lines of one or more log files. A first graphical user interface allows a user to select a line from a log file under analysis, search for matching lines in the log file, define rules for parsing the log file, and tokenize attributes of the selected lines. A second user interface allows the user to aggregate defined rules so that messages may be correlated to identify events that occur across multiple lines.

20 Claims, 8 Drawing Sheets

LOG QUERY USER INTERFACE

BACKGROUND

This disclosure relates generally to analyzing computer-generated records, and in particular to a user interface for converting log messages into events insights.

Many components within a distributed computing system produce log data. As the number, size, and complexity of distributed computing networks grow, the volume and variety of log files also increases. The large volume of log data can be difficult and tedious to analyze. Conventional logging products are often limited because they use raw text search or use preformatted data structures to analyze log data. Accordingly, it becomes increasingly difficult for logging products to parse log files, identify potential issues, and find errors for multiple data sets and across multiple applications.

SUMMARY

The embodiments herein describe a graphical user interface that allows a user to define rules for parsing unstructured and structured log data by generating and linking multiple parsing rules. A first graphical user interface allows a user to select a line from a log file under analysis, search for matching lines in the log file, define rules for parsing the log file, and tokenize attributes of the selected lines. A second user interface allows the user to link the defined rules to form an aggregated rule. The aggregated rule may be applied to one or more log files to correlate messages included in multiple log lines and/or log files to identify events that occur across multiple lines.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
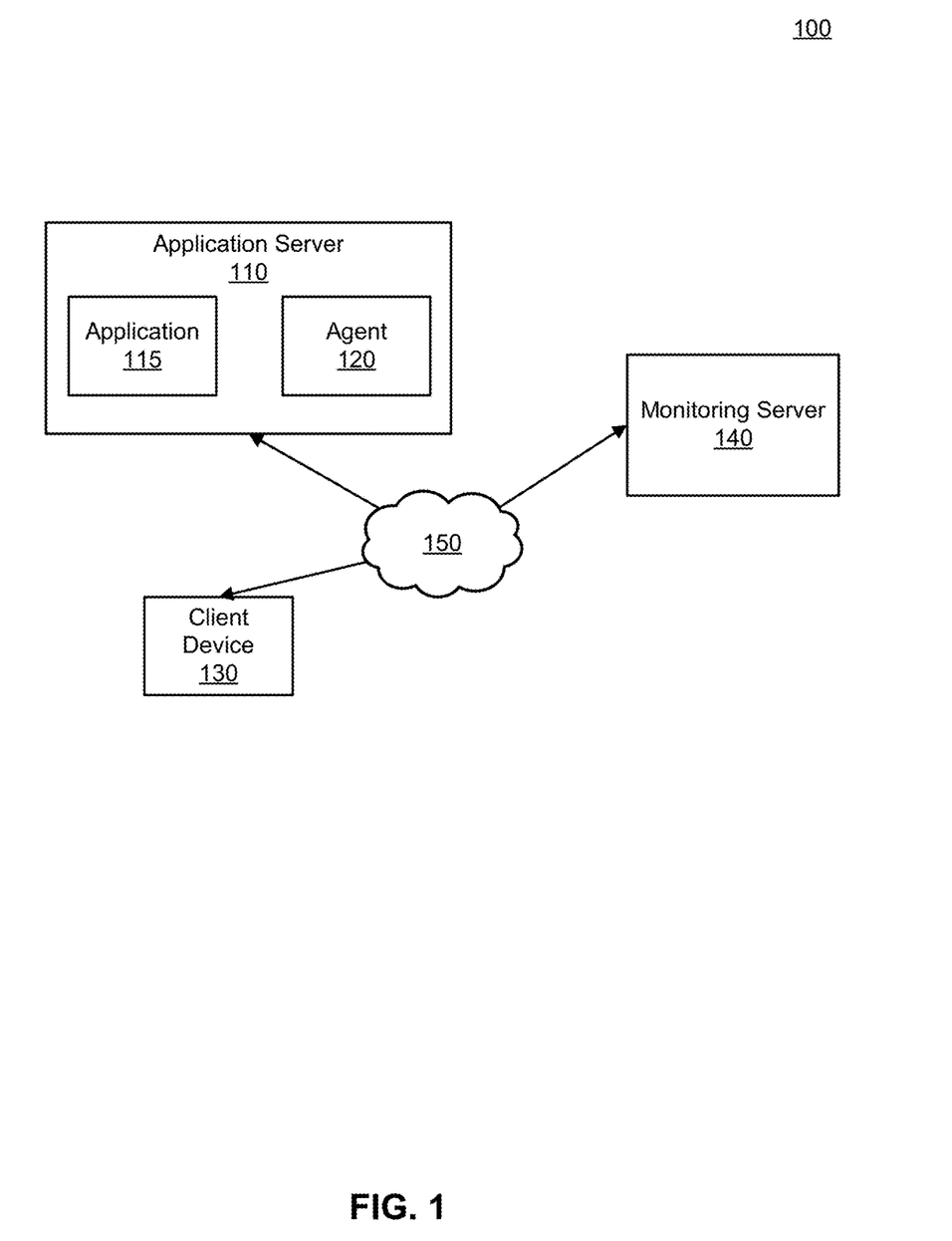
FIG. 1 illustrates a system environment for executing a log query user interface, according to one embodiment.

FIG. 1 illustrates a system environment for executing a log query user interface, according to an embodiment. In one embodiment, the system environment includes a server 110, a client device 130, and a monitoring server 140 communicating over a network 150. The client device 130 includes one or more computing devices capable of receiving user input as well as transmitting and/or receiving data via the network 150. In one embodiment, a client device 130 is a conventional computer system, such as a desktop or laptop computer. Alternatively, a client device 130 may be a device having computer functionality, such as a personal digital assistant (PDA), a mobile telephone, a smartphone, or another suitable device. A client device 130 is configured to communicate via the network 150. In one embodiment, a client device 130 executes an application allowing a user of the client device 130 to interact with the server 110. For example, a client device 130 executes a browser application to enable interaction between the client device 130 and the server 110 via the network 150. In another embodiment, a client device 130 interacts with the server 110 through an application programming interface (API) running on a native operating system of the client device 130, such as IOS® or ANDROID™. Although a single client device 130 is shown in FIG. 1, any number of client devices 130 may interact with the server 110 via the network 150.

The client device 130 is configured to communicate with the server 110 via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The server 110 operates an application 115 and an agent 120. The application 115 may be any of a variety of types of messaging applications, mobile applications, or web applications, and may represent a subset of operations of a client-server application. The application 115 operated by the server 110 includes any server-side processes of a client-server application, such as retrieving and storing database content, generating user interfaces for rendering at the client device 130, performing functions requested at the client device 130, and communicating content to the client device 130 (e.g., over the network 150). In one implementation, the server 110 is an e-mail server that serves e-mail messages to the client device 130. In another implementation, the server 110 is a web server 110 that serves a web page to a client device 130 for display to a user. Although a single server 110 is shown in FIG. 1, the server 110 may comprise one or more computing devices executing the functions of the application 115, and the environment may include any number of servers 110 operating any number of applications 115.

The agent 120 monitors performance of the application 115, including processes running on the server 110, response time of the application 115, behavioral context of user activity at a client device 130, and/or other information. The agent 120 is a set of software modules executed by the server 110 that monitors the application 115 by injecting code into the application 115.

The monitoring server 140 monitors performance of the application server 110. The monitoring server 140 may be hosted by an application monitoring service provider, and may monitor performance of any number of application servers. In one embodiment, the monitoring server 140 is hosted by New Relic, Inc. and executes NEW RELIC APM. In one embodiment, the monitoring server 140 is configured to operate on a computing device that includes one or more processing devices particularly configured to execute instructions to perform the functions of the monitoring server 140. The processing devices are configured to execute instructions that produce a series of graphical user interfaces that enable a user to define rules for parsing unstructured and structured log data, and apply the parsing rules to multiple log lines included in one or more log files.

To monitor the server 110, the monitoring server 140 provides the agent 120 to the server 110 and receives data from the agent 120. Data collected by the agent 120 may be presented in a user interface for display to an administrator of the server 110.

Log Data Parsing User Interface

Figure 2:
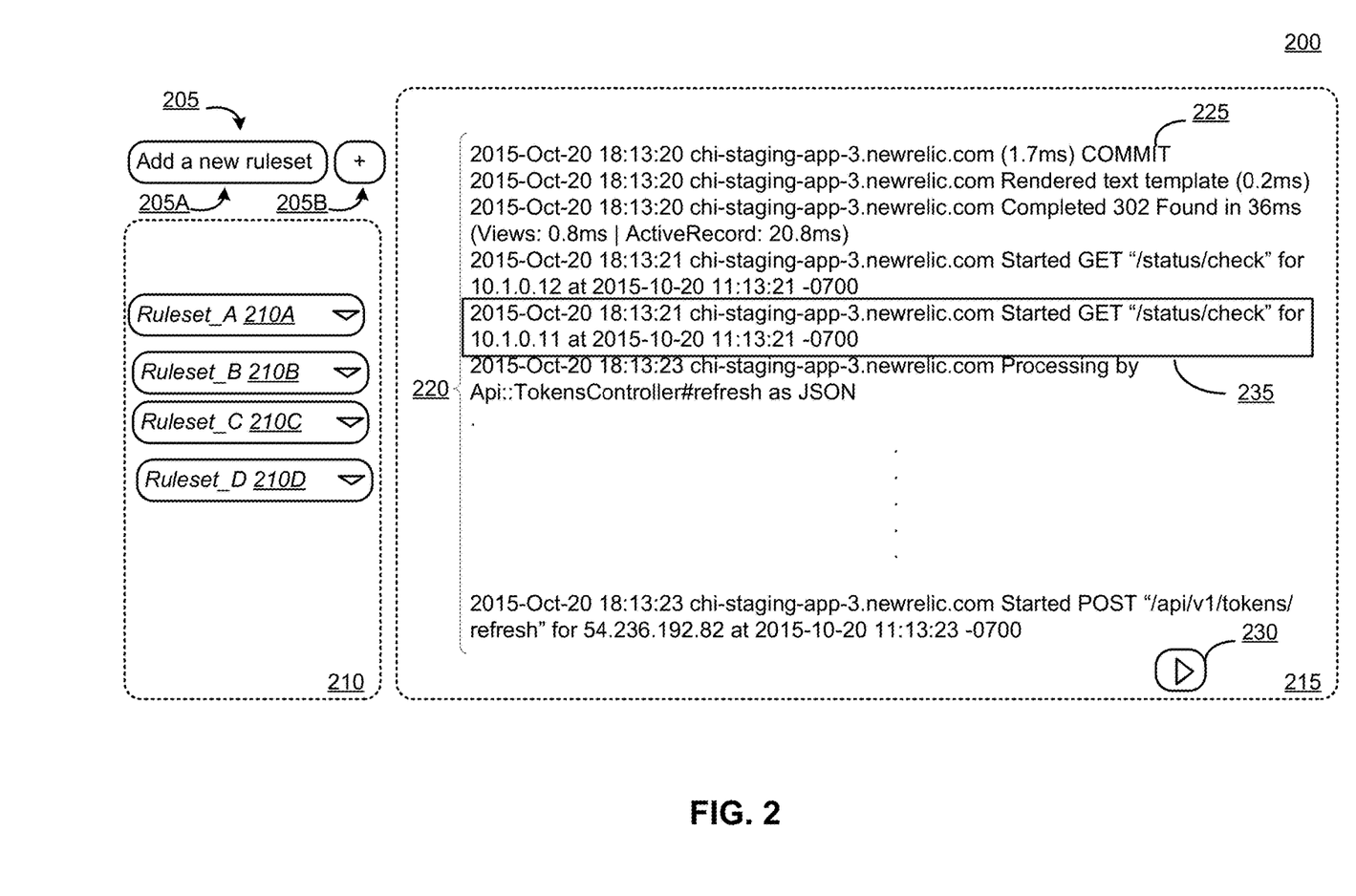
FIG. 2 is a block diagram illustrating a rule definition user interface for defining one or more rule sets to parse log data information from an application executing on an application server of FIG. 1, according to one embodiment.

FIG. 2 is a block diagram illustrating a user interface 200 for defining one or more rule sets to parse log data information from an application 115 executing on a server 110, according to one embodiment. A rule set is a group of one or more rules that are applied to a log file to parse the log file. For example, a rule set may include multiple rules to parse lines related to an incoming request received by the server 110. As shown in FIG. 2, the user interface 200 includes a rule set definition section 205, a rule set selection section 210, and a log line display section 215 that displays a portion of a log file 205. In one embodiment, the user interface 200 is generated by the monitoring server 140 and presented for display to one or more client devices 130 via the network 150.

The user interface 200 includes a rule set definition section 205 that includes a name input field 205A for receiving a name specifying a rule set for parsing a log file, and an add button 205B for adding the rule set name to a rule set selection section 210. The rule set selection 210 includes a list of rule sets names corresponding to information received in the name input field 205A. The rule set names may be added responsive to the add button 205B receiving a selection input. For example, the rule set selection section in FIG. 2 shows four rules, corresponding to four different rule set names—Rule set_A, Rule set_B, Rule set_C, and Rule set_D received in the name input field 205.

The log line display section 215 includes a portion 220 of a log file generated by one or more applications, operating systems, servers, or other component of the distributed networking system capable of generating a log file. A log file may include a record of actions performed on various components within a distributed network system. Example actions include events such as information about access requests to the server 110, pages viewed by a client device, and errors that occurred while processing the request. In some cases, log files may be automatically generated by an operating system or an application operating on the server 110. The automatically generated logs may be written to a specified location in memory included in the server 110. Log files may have a specified format based on the application or operating system that generated the particular log file. In other cases, a log file format may be unstructured or raw text. The monitoring server 140 may retrieve the logs directly from the specified memory location or indirectly via the agent 120.

The portion 220 of the log file shown in FIG. 2 includes multiple lines 225 arranged chronologically (i.e., from oldest to newest or newest to oldest). In one implementation, the portion 220 of the log file displayed in the log line display section 215 corresponds to a live tail of a log file generated by an application operating an application server. For example, the agent 120 may execute the command tail -f/path/thefile.log, which causes the last ten lines of a log file stored in a memory component of the application server 110 to be displayed in the stream section and continuously updated as new lines 225 are added to the log. In other implementations, the portion 220 of the log file may include less than or greater than the number of lines shown in FIG. 2. In stream mode, where the log file is generated from a currently executing application, the display of the live tail of the log file continues to update until the play/pause button 230 receives an indication of a selection. To resume the updating of the displayed log file, the play/pause button 230 receives another indication of a selection after the live tail feed has been paused.

The feed may be paused by the user to allow the user interface 200 to receive an indication of a selection of a line 225 for specifying a rule to include in the specified rule set for parsing the log file. When the feed is paused, an indication of the selection of a line 225 may be received via the log line display section 215 to specify a rule to include in the rule set. In one embodiment, the indication of a selection a line 225 may include clicking on a portion of a selected line 235, passing a pointer over a portion of the selected line 235, or other means of indicating a selection of a line via the log line display selection 215.

Figure 3:
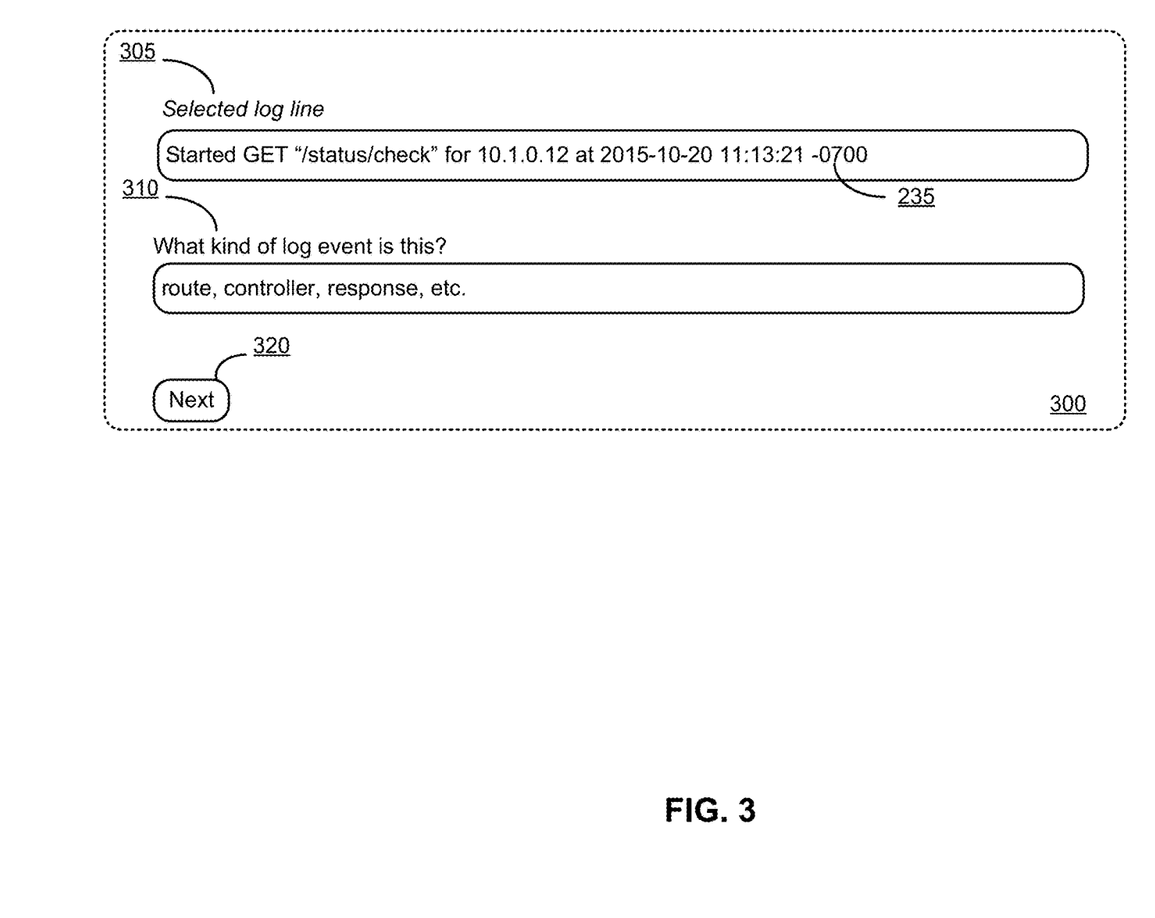
FIG. 3 is a block diagram illustrating a rules user interface for specifying a rule to include in the rule set of FIG. 2, according to one embodiment.

FIG. 3 is a block diagram illustrating a rules user interface 300 specifying a rule to include in the rule set of FIG. 2, according to one embodiment. The user interface 300 is generated by the monitoring server 140 responsive to receiving an indication of a selection of a line 225 from the log line display section 215. The user interface 300 for specifying a rule name corresponding to the selected line 235 includes a selection field 305 for displaying the selected line 235, and an input rule name field 310 for receiving information about the selected line 235. Information about the selected line 235 may describe the type of log event associated with the line 235. Example types of log events may include route, controller, response, etc. For example, the selected line 235 may describes the first step of an incoming request to the server 110, which corresponds to a "route" type of log event. Responsive to receiving an indication of selection of the "next" button 320, the user interface 300 is replaced by the search user interface 400.

Figure 4:
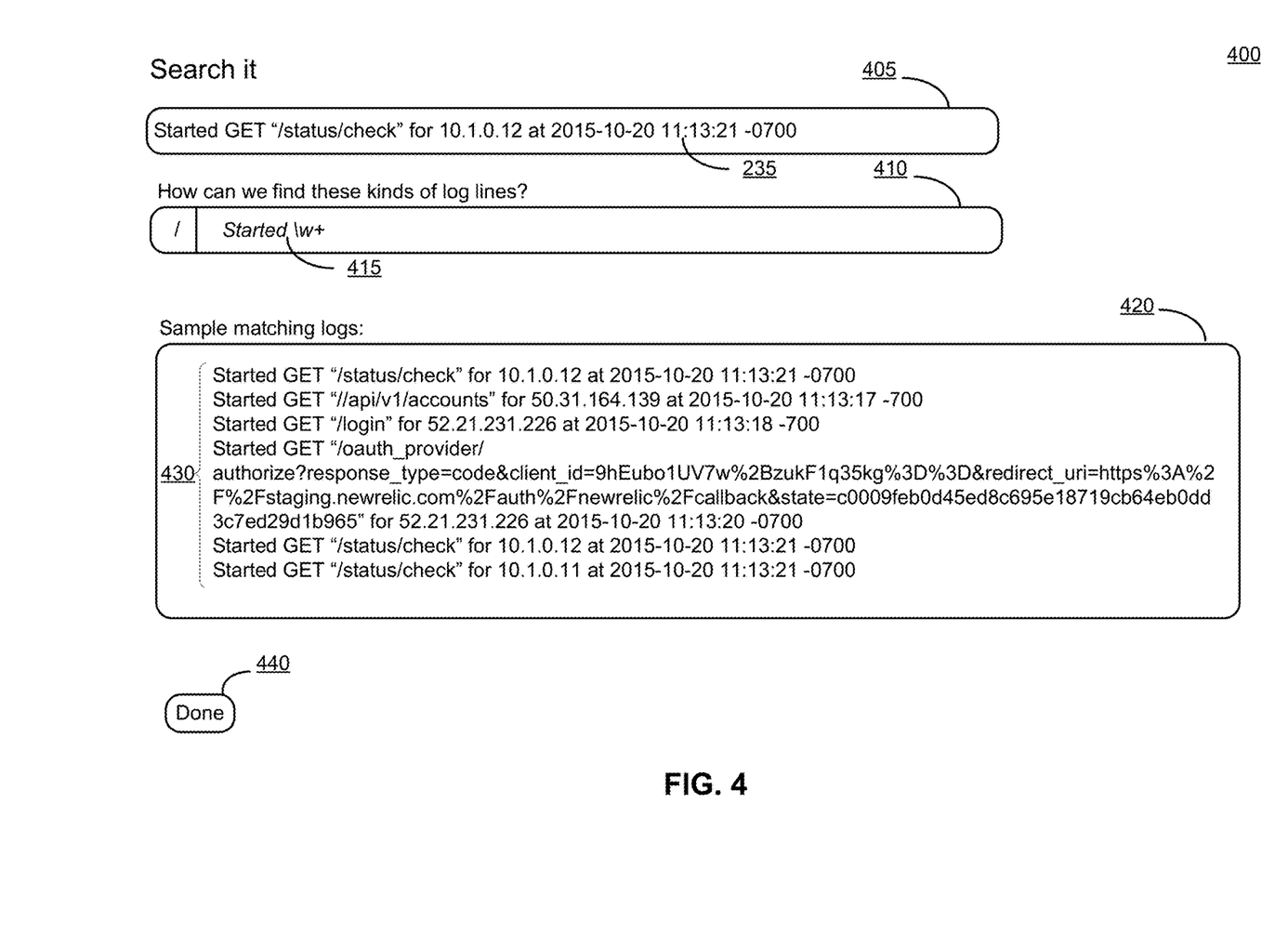
FIG. 4 is a block diagram illustrating a user interface for searching for lines in a log file under analysis similar to a selected line, according to one embodiment.

FIG. 4 is a block diagram illustrating a user interface 400 for searching for lines similar to the selected line in FIG. 3, according to one embodiment. The user interface 400 is generated by the monitoring server 140 responsive to receiving information describing the selected line 235. The user interface 400 includes a selection field 405 for displaying the selected line 235, a search field 410 for receiving information describing messages in the log file that are similar to the selected line 235, and a search confirmation display area 420 for displaying lines 430 matching the selected line 235.

In the embodiment shown in FIG. 4, to search for a line similar to the selected line 235, the search field 410 receives information formatted as a regular expression. The regular expression may include a sequence of characters that define a search pattern. For example, as shown in FIG. 4, the regular expression "Started\w+," retrieves lines from the log file that are similar to the selected line 235. Responsive to receiving information in the search field 410, the monitoring server 140 filters the log file to identify other lines having characteristics matching those specified in the search field 410 for parsing. The filtered results 430 are displayed in the search confirmation display area 420 to visually confirm that the search information received by the search field 410 is identifying lines included in the log file that are similar to the selected line 235. Responsive to receiving an indication of selection of the "next" button 440, the search user interface 400 is replaced by the tokenization user interface 500.

Figure 5:
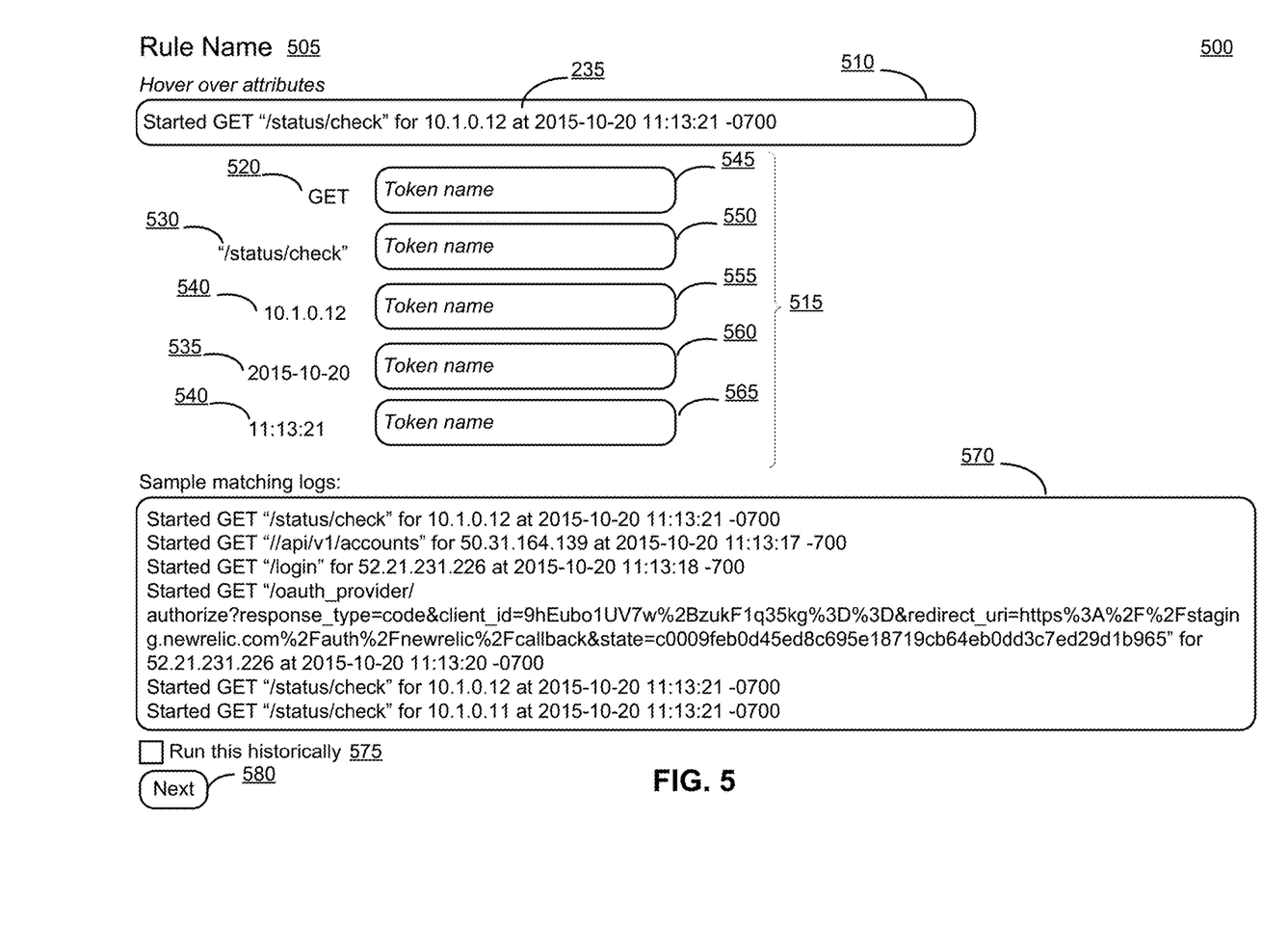
FIG. 5 is a block diagram illustrating a tokenization user interface for tokenizing the selected line in FIG. 3, according to one embodiment.

FIG. 5 is a block diagram illustrating a tokenization user interface 500 for tokenizing the selected line in FIG. 3, according to one embodiment. The tokenization user interface 500 allows a user to select different portions of the selected line 235, which are then automatically presented as standalone attributes within the tokenization user interface 500. The tokenization user interface 500 includes a rule name 505 (specified in interface in FIG. 3) identifying the particular rule, a selection field 510, a line attribute tokenization section 515, and a matching line display area 570.

The selection field 510 displays the selected line 235 and provides an interface to select one or more attributes of the selected line 235 and associate each selected attribute with a name. In one embodiment, an attribute of the selected line 235 may be selected by moving a pointer, such as a cursor or a mouse icon, over an attribute for at least a specified time period. In another implementation, a selection may be indicated by moving a cursor, icon, or other visual pointer over an attribute and clicking a mouse or like input device. In one embodiment, the monitoring server 140 may employ a lexical grammar program that is generated when a line is selected, which breaks up the selected line into key/value components. The grammar program is evaluated against every line included in the log file, and outputs the line with the key/value components. In another embodiment, the client device 130 may employ the grammar program independently or in conjunction with the monitoring server 140.

Responsive to receiving an indication of a selection of an attribute of the selected line 235, the monitoring server 140 displays each selected attribute next to an input filed for receiving a name for the attribute in the attribute tokenization section 515. The attribute tokenization section 515 includes one or more rows, each row including a selected attribute and name field for associating a name with the attribute. For example, as shown in FIG. 5, the selected components of the line 235 include "GET" 520, "/status/check" 530, "10.1.0.12" 540, "2015 Oct. 20" 535, and "11:13:21" 540. When the attribute "GET" is selected, the corresponding attribute "GET" 520 is added to the tokenization section 515 along with an input field 545 for receiving a name for the attribute "GET" 520. The same process is repeated for each selected attribute, each selection creating a new row in the attribute tokenization section 515. Each new row includes the selected attribute and an input field for receiving an attribute name. Lines matching the selected line 235 are displayed in the search confirmation display area 570 to visually confirm that the attribute extraction works on similar lines included in the log file under analysis. In another embodiment, the selected line 235 may include structured data, in which case, tokenization user interface 500 automatically selects attributes and performs the tokenization.

In one embodiment, to improve the usability of the tokenization user interface 500 each selected attribute is coded with unique visual identifier. Example visual identifiers may include font color, a highlight color overlaying text, or other type of indicator that visually distinguishes each selected attribute from one another. Unique visual identifiers may be placed on the individual attributes in the selected line 235, the attribute name, input field, and attributes in the matching lines included in the search confirmation area 570. The aforementioned rule definition and attribute tokenization process may be repeated for each rule included in a rule set. For example, the process may be repeated for each step of a request life cycle, which includes rules for "control," "parameters," and "response."

In one embodiment, the aforementioned attribute tokenization process may be applied to historical log data responsive to receiving an indication of a selection of the "Run this historically" selection box 575. The monitoring server 140 may close the tokenization user interface 500 responsive to receiving an indication of a selection of the finish button 580.

Figure 6:
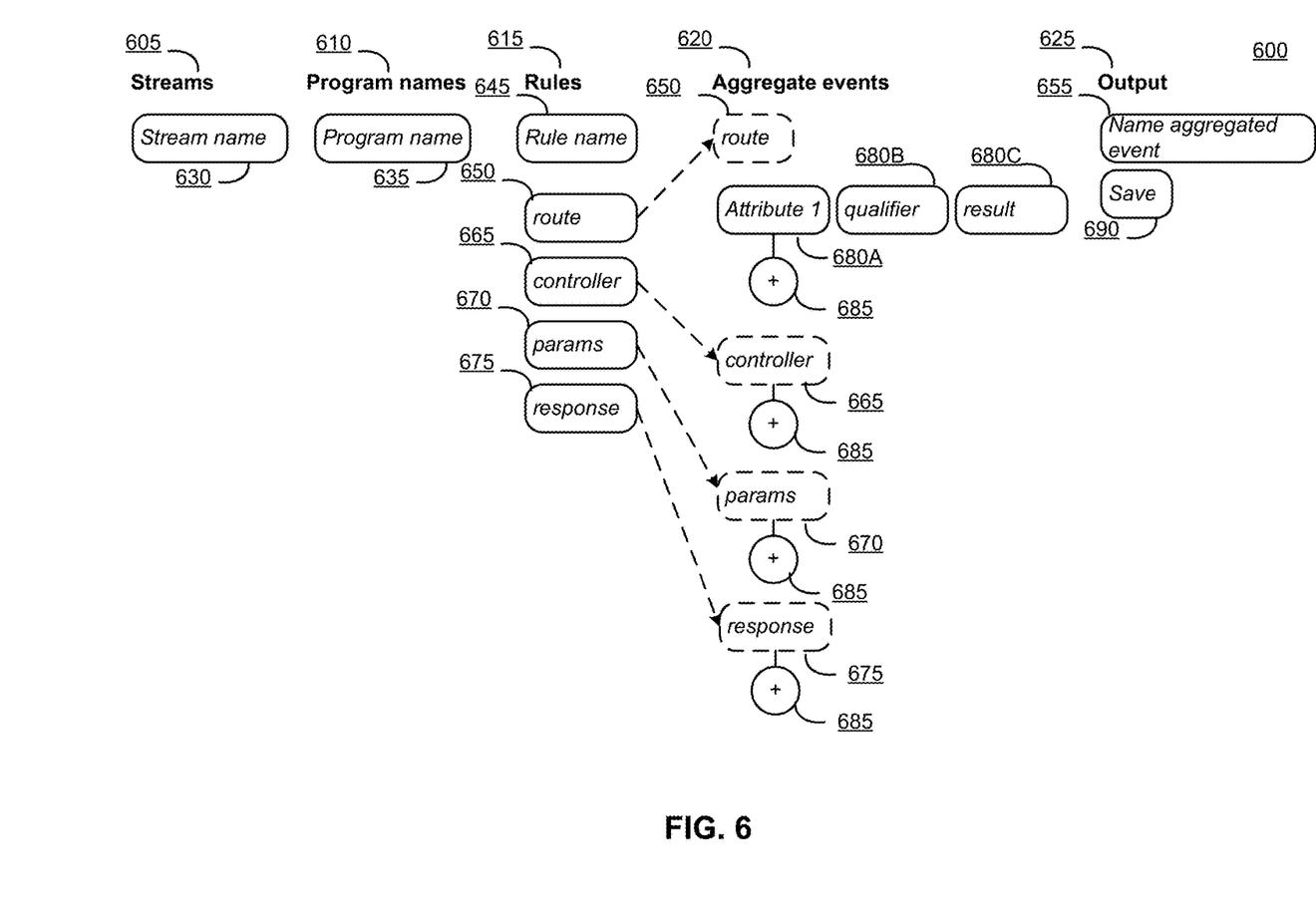
FIG. 6 is a block diagram illustrating an event aggregation user interface, according to one embodiment.

The tokenized lines may be used by a log query interface to perform queries on the log data based on the selected attributes. In some situations, however, data may be spread over multiple lines. For example, performing a log query to look for someone logging-in from multiple countries by crossing the email address with an Internet Protocol (IP) address uses data from multiple lines. In such a situation, the ability of a logging system to correlate messages from multiple lines to identify a particular event is highly beneficial. The rule aggregation user interface 600 provides an interface for correlating multiple log rules into a stand-alone event. In one embodiment, the monitoring server 140 builds a JavaScript program that links together streaming data events and generates new events when the specified sequence of rules occurs. For example, the monitoring server 140 may be configured to correlate rules for a request life cycle—route, controller, params, and response—and join data generated by each rule into a new event.

FIG. 6 is a block diagram illustrating an event aggregation user interface 600, according to one embodiment. In the embodiment shown in FIG. 6, the aggregation user interface 600 allows a user to select from a list of pre-defined rules and link those rules together to form an aggregated event. Pre-defined rules, as discussed in FIG. 5, may be defined using the content or any attribute of a log line. Thus, the aggregation user interface 600 allows one or more log files to be searched broadly by creating unique combinations of rules linked together by various combinations of content items and/or attributes included in one or more log lines.

In the embodiment shown in FIG. 6, the rule aggregation user interface 600 includes multiple columns labeled "Stream," "Program names," "Rules," "Aggregated events," and "Output." The streams 605 column includes a field 630 that specifies an application associated with a log file under evaluation. In one example, the streams 605 columns includes a field 630 that specifies an authentication service of an access control application operation on the application server 110. The column program names 610 include a field 635 that specifies the application format. In one example, the application format may be Ruby on Rails or referred to herein as Rails. The rules 615 column includes one or more fields 645 that list one or more rules. The one or more fields 645 specify a rule that corresponds to the rules specified in the rules user interface 300. For example, as shown in FIG. 6, the one or more fields in the rules 615 column include a first field 650 specifying the route rule, a second field 665 specifying the controller rule, a third field 670 specifying the parameters rule, and a fourth field 675 specifying a response rule.

Each rule field may be selected from the list of rule fields specified in the rules 615 column and dragged to a position in the aggregated events 620 column to create an aggregated rule. For example, as shown in FIG. 6, the route rule field 650 from the rules 615 column may be selected and moved to the aggregated events 620 column. The process is repeated for the remaining rules associated with the response life cycle by moving the controller rule field 665, the parameters rule field 670, and the response rule field 675 to the aggregated events column 620. Once moved to the aggregated events 620 column, a link indicator 685 appears below the moved rule field to enable it to be linked to another moved rule field positioned immediately below the moved rule field. In the example shown in FIG. 6, the arrangement of the rule fields listed in the aggregated events column 620 causes the monitoring server 140 to correlate the route, controller, parameters, and response rules together to create a standalone event. Put another way, when the monitoring server 140 sees a route rule, followed by a controller rule, parameters rule, and response rule it joins all of the data generated by those rules into a standalone event. In one embodiment, the arrangement of the rule fields listed in the aggregated events 620 column causes the client device 130 to correlate the selected rules together to create a standalone event. In other embodiments, the client device 130 and the monitoring server 140 may operate in conjunction to aggregate the selected rules to create a standalone event.

In one embodiment, links between the steps may be further qualified responsive to receiving an indication of a selection of the link indicator 685 associated with the respective rule. The selection of a link indicator 685 generates an attribute field 680A, a condition field 680B, and a result field 680C. The attribute field 680A may present a drop down selection list of attributes for the respective rule responsive to receiving an indication of a selection of the attribute field 680A. Attributes included in the drop down list correspond to the attributes specified during the tokenization process as previously discussed with respect to FIG. 5. The condition field 680B presents a drop down selection list of conditions associated with the attribute selected in the attribute field 680A. For example, when the "url" attribute is selected in the attribute field 680A for the route rule, the conditions included in the drop down list of the condition field 680B include "equals," "does not equal," "contains," "does not contain," "is set," "is not set," and "is an attribute of." The result field 680C may include a drop down selection list in a manner similar to the attribute field 680A and the condition field 680B. Results included in the result field 680C depend on the selections made in the attribute field 680A and condition field 680B. For example, when the "url" attribute is selected in the attribute field 680A for the route rule, and "contains" is selected for the condition for the condition field 680B, the result "login" may be selected for the results field 680C.

The resulting event associated with generating the aggregated rule may be named by receiving information describing the aggregated event in a name event field 655 in the output column 625. The arrangement of the aggregated rule may be saved via the aggregation event user interface 600 responsive to receiving a selection of the save button 690.

Figure 7A:
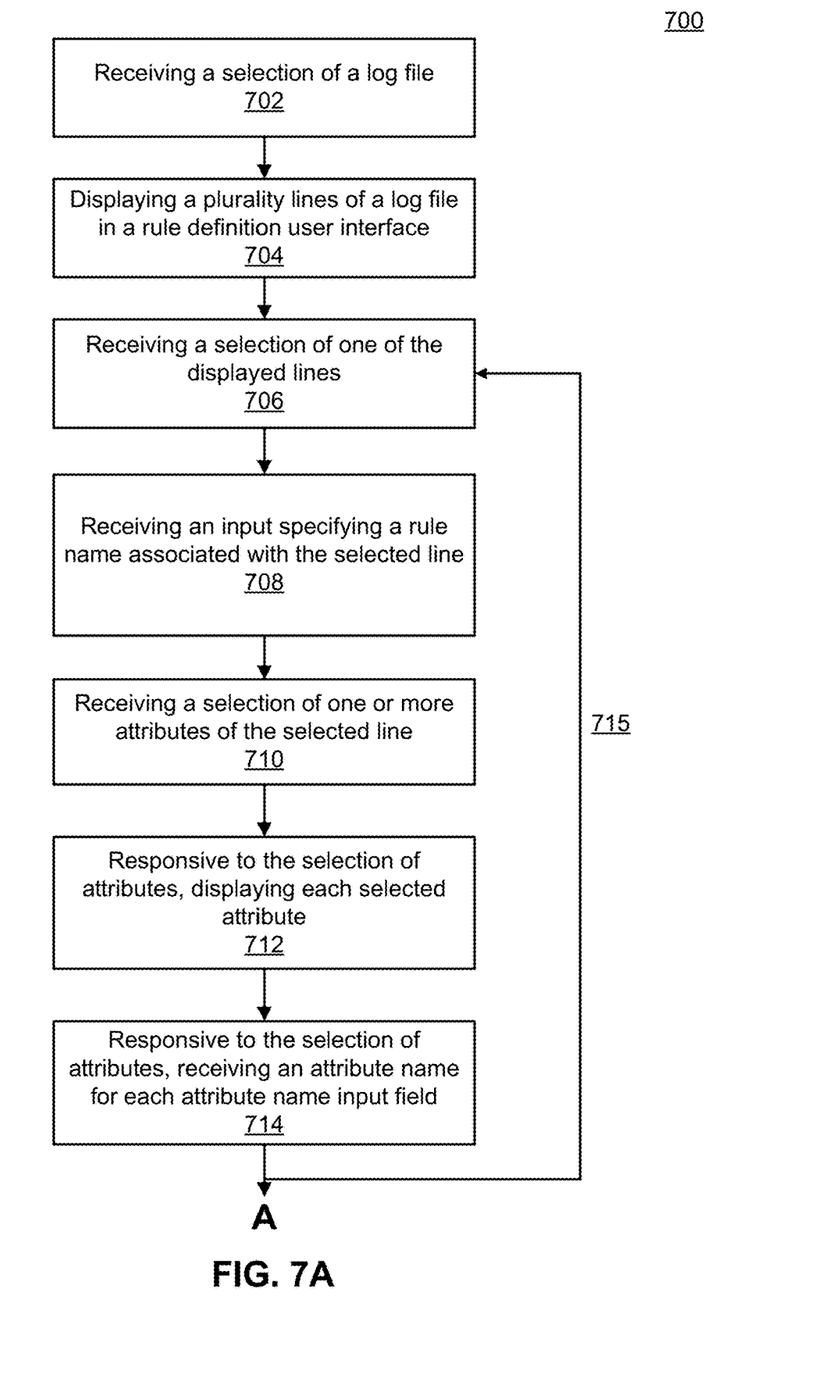
FIG. 7A illustrates a flowchart describing a portion of a method for specifying an aggregated event, according to one embodiment.

FIG. 7A illustrates a flowchart describing a portion of a method for specifying an aggregated event, according to one embodiment. In one embodiment, the monitoring server 140 receives 702 a selection of one or more log files for analysis. The selected log files may be associated with a single application or multiple applications operating on the same or different computing devices. In one embodiment, the monitoring server 140 retrieves the selected log file from the application server 110 using an agent 120 operating on the server 110. In another embodiment, the monitoring server 140 retrieves the selected log file by interacting with the application 115 via the network 150.

The monitoring server 140 generates a rule set user interface 200 for the selected log files under analysis. The rules set user interface 200 includes an indication of information describing the log file under analysis along with an input field for adding a new rule set that includes one or more rules for parsing lines included in the log file. During analysis, the rule set user interface 200 receives information describing a new rule set (e.g., a name) in the input filed for adding a new rule set along with an indication of a selection to add the new rule set. The indication may include an indication of selecting a plus button adjacent to the input field. Responsive to receiving the indication of a selection to add the new rule set, the information describing the new rule set is added to a rule set selection list in the rule set user interface.

The monitoring server 140 presents 704, for display on a client device 130, multiple lines from a log file under analysis in a line display section of the rule set user interface 200. In one embodiment, the multiple lines correspond to a portion of the lines from one or more log files under analysis. The portion of lines may correspond to a stream (i.e., presently executing) from one or more applications 115 or may correspond to lines from a log of a previously executed application.

In one embodiment an indication of a selection of a line from the line display section is received 706. Example indication of a selection may include clicking on a portion of a line, selecting a line via an input from a keyboard, or other selection method using an input device for interacting with the rule definition user interface 200.

Responsive to receiving the selection of the line, the monitoring server 140 generates a dialog box 300 for receiving 708 information describing a rule associated with the selected line 235. Example information includes information describing a type of log event that corresponds to the selected line 235 or other information identifying the selected line 235. In one embodiment, the monitoring server 140 generates a search user interface 400 that enables a user to search for additional lines from the log file under analysis that include attributes matching those of the selected line 235. The search user interface 400 includes a search field for receiving information about attributes in the selected line 235 that may also be included in other lines included in the log file under analysis. The monitoring server 140 receives the information (e.g., regular expressions) in the search field via the search user interface 400, and filters the log file under analysis using the received information to identify matching or similar lines. Lines determined to be similar or matching are displayed in a search confirmation display area within the search user interface 400.

The monitoring server 140 provides for display on a client device 130 a tokenization user interface 500 for tokenizing the selected line 235. The monitoring server 140 receives 710 an indication of selection of one or more attributes of the selected line 235 presented for display in a selection field of the tokenization user interface 500. Responsive to the selection of each attribute of selected line, the monitoring server 140 displays 712 the selected attribute along with an input field for naming the selected attribute in an attribute tokenization section to the tokenization user interface 500. The monitoring server 140 displays lines from the log file under analysis matching log the selected line in displayed in the search confirmation display area 420 to visually confirm that the attribute extraction works on similar lines 430.

In one embodiment, responsive to selection of each attribute of the selected line 235, the monitoring server 140 applies a visual identifier to each selected attribute displayed in the selection field. The monitoring server 140 also applies the visual identifier to the attribute name adjacent to input field in the tokenization section, and to the corresponding attributes of lines displayed in the search confirmation area.

The monitoring server 140 receives 714 an attribute name in the input field associated with the one or more attributes listed in the tokenization section of the tokenization user interface 500. In one embodiment, the monitoring server 140 determines that a selected line is associated with structured data and automatically selects attributes, performs the tokenization, and displays the tokenized result in the tokenization user interface 500.

Figure 7B:
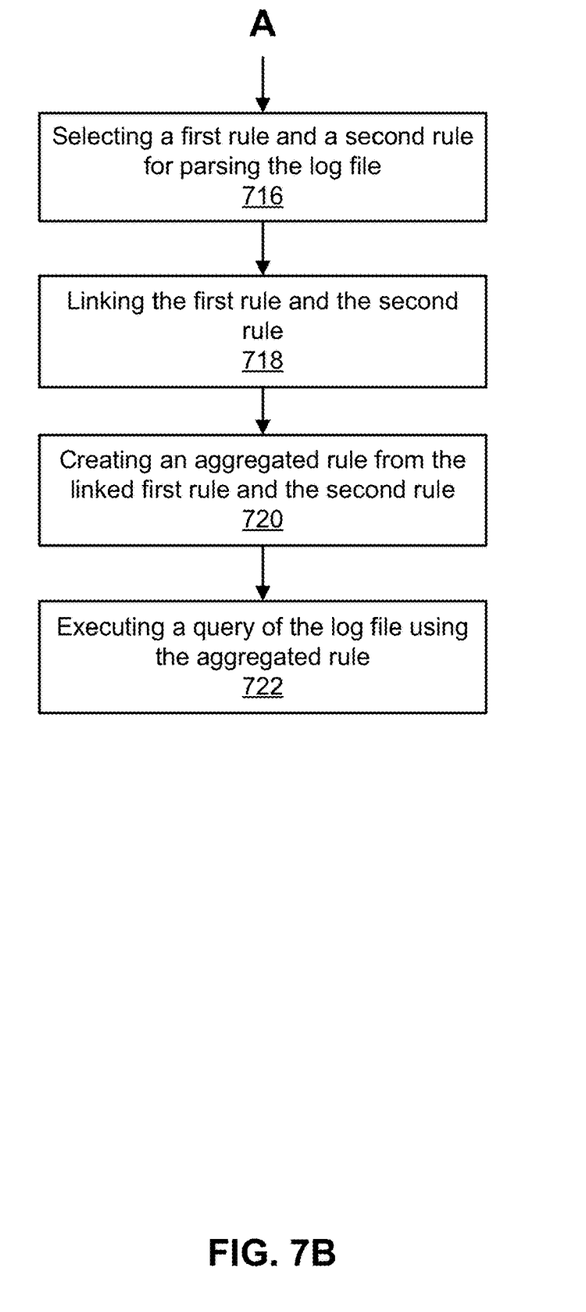
FIG. 7B illustrates a flowchart describing another portion of the method of FIG. 7A for specifying an aggregated event, according to one embodiment.

Additional rules to include in a rule set may be defined 715 by repeating steps 706-714 until the rule set is complete. This, in turn, generates multiple rules that may be correlated to identify events that occur across multiple lines of the one or more log files under analysis. FIG. 7B illustrates a flowchart describing a remaining portion of the method of FIG. 7A for specifying an aggregated event, according to one embodiment. The monitoring server 140 receives an indication of a selection 716 of at least two rules, a first rule and a second rule, from a list of rules included in an event aggregation user interface 600. Responsive to the selection of the first rule, the monitoring server 140 moves a field displaying the name of the first rule along with a rule link indicator to an aggregated events column of the event aggregation user interface 600. Similarly, responsive to the selection of the second rule, the monitoring server 140 moves a field displaying the name of the second rule along with a rule link indicator below the field corresponding to the first rule in the aggregated events column. In some embodiments, an indication of a selection of the link indicator of the first rule is received, which causes the generation of an attribute field, condition field, and result field to be display below the name input field of the first rule. One or more of the attribute field, condition field, and the result field may display a drop down list of options for selection to further specify how the first rule may be linked to the second rule as previously described with reference to FIG. 6.

The monitoring server 140 links 718 the first rule with the second rule in accordance with selected conditions, which creates 720 an aggregated rule. Using the aggregated rule, the monitoring server 140 may be used to execute a query 722 of the one or more log files under analysis. Rules defined in accordance with steps 706-714 (i.e., previously defined rules) may be applied to different log files from which the rules were initially defined. Previously defined rules may be applied individually or as an aggregated rule specified in accordance with FIG. 7B.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method, comprising:
   displaying, in a user interface for querying a log file, a plurality of lines of one or more log files;
   receiving, at the user interface, a selection of at least a first and a second of the plurality of displayed lines;
   for each of the selected lines:
   receiving, at a name input field, an input specifying a rule name associated with the selected line,
   receiving, at a selection field, a selection of one or more attributes of the selected line,
   responsive to the selection of each of the one or more attributes of the selected line:
   displaying an attribute name input field in the user interface, the attribute name input field associated with the selected attribute, and
   receiving an attribute name for each of the displayed attribute name input fields;

selecting, in a rules column of the user interface, a first rule and a second rule for parsing the log file, the first rule indicated by a first rule name associated with the first selected line and the second rule indicated by a second rule name associated with the second selected line;

linking, in an aggregated column of the user interface, the first rule and second rule by associating at least one attribute name associated with first rule with the second rule name;

creating an aggregate rule from the linked first rule and the second rule; and executing a query of the log file using the aggregated rule.

2. The method of claim 1, wherein the log file includes one or more lines from different applications.

3. The method of claim 1, wherein the log file is generated from a rails application.

4. The method of claim 1, wherein the log file includes one or more lines generated prior to defining the rules.

5. The method of claim 1, further comprising:
displaying a search interface;
receiving, in a search field included in the search interface, an input specifying one or more regular expressions included in the selected line; and
displaying, in the search interface, one or more lines that include the one or more specified regular expressions.

6. The method of claim 1, wherein the selected line includes structured data.

7. The method of claim 1, further comprising displaying in each attribute name input field a token corresponding to each attribute of the selected line that includes structured data.

8. The method of claim 1, further comprising associating a different visual indicator with each selected attribute.

9. The method of claim 8, further comprising:
displaying one or more lines that include one or more of the selected attributes; and
associating the different visual indicators with each attribute of the displayed one or more lines that include the one or more selected attributes.

10. The method of claim 1, wherein linking the first rule and the second rule comprises:
receiving a selection of one or more attributes of the first rule; and
linking the selected attributed of the first rule to the second rule.

11. A non-transitory computer readable storage medium storing executable computer program instructions, the instructions when executed by a processor causing the processor to:
display, in a user interface for querying a log file, a plurality of lines of one or more log files;
receive, at the user interface, a selection of at least a first and a second of the plurality of displayed lines;
for each of the selected lines:
receive, at the user interface, an input specifying a rule name associated with the selected line,
receive, at a name input field, a selection of one or more attributes of the selected line,
responsive to the selection of each of the one or more attributes of the selected line:
display an attribute name input field in the user interface, the attribute name input field associated with the selected attribute, and
receive an attribute name for each of the displayed attribute name input fields;
select, in a rules column of the user interface, a first rule and a second rule for parsing the log file, the first rule indicated by a first rule name associated with the first selected line and the second rule indicated by a second rule name associated with the second selected line;
link, in an aggregated column of the user interface, the first rule and second rule by associating at least one attribute name associated with first rule with the second rule name;
create an aggregate rule from the linked first rule and the second rule; and
execute a query of the log file using the aggregated rule.

12. The non-transitory computer readable storage medium of claim 11, wherein the log file includes one or more lines from different applications.

13. The non-transitory computer readable storage medium of claim 11, wherein the log file is generated from a rails application.

14. The non-transitory computer readable storage medium of claim 11, wherein the log file includes one or more lines generated prior to defining the rules.

15. The non-transitory computer readable storage medium of claim 11, further comprising, the instructions when executed by the processor cause the processor to:
display a search interface;
receive, in a search field included in the search interface, an input specifying one or more regular expressions included in the selected line; and
display, in the search interface, one or more lines that include the one or more specified regular expressions.

16. The non-transitory computer readable storage medium of claim 11, wherein the selected line includes structured data.

17. The non-transitory computer readable storage medium of claim 11, further comprising, the instructions when executed by the processor cause the processor to display in each attribute name input field a token corresponding to each attribute of the selected line that includes structured data.

18. The non-transitory computer readable storage medium of claim 11, further comprising, the instructions when executed by the processor cause the processor to associate a different visual indicator with each selected attribute.

19. The non-transitory computer readable storage medium of claim 18, further comprising, the instructions when executed by the processor cause the processor to:
display one or more lines that include one or more of the selected attributes; and
associate the different visual indicators with each attribute of the displayed one or more lines that include the one or more selected attributes.

20. The non-transitory computer readable storage medium of claim 11, wherein the instructions when executed by the processor cause the processor to link the first rule and the second rule comprises:
receiving a selection of one or more attributes of the first rule; and
linking the selected attributed of the first rule to the second rule.

* * * * *

UNITED STATES PATENT AND TRADEMARK OFFICE
CERTIFICATE OF CORRECTION

PATENT NO. : 10,311,043 B2
APPLICATION NO. : 15/228908
DATED : June 4, 2019
INVENTOR(S) : Julian V. Giuca

Page 1 of 1

It is certified that error appears in the above-identified patent and that said Letters Patent is hereby corrected as shown below:

In the Claims

Column 12, Claim 20, Line 59, (approx.) delete "attributed" and insert --attributes--.

Signed and Sealed this
Twenty-seventh Day of October, 2020

Andrei Iancu
*Director of the United States Patent and Trademark Office*